(12) United States Patent
Niiya

(10) Patent No.: US 11,079,215 B2
(45) Date of Patent: Aug. 3, 2021

(54) DETECTION DEVICE

(71) Applicant: DMG MORI Co., Ltd., Yamatokoriyama (JP)

(72) Inventor: Masayuki Niiya, Isehara (JP)

(73) Assignee: DMG MORI Co., Ltd., Nara (JP)

( * ) Notice: Subject to any disclaimer, the term of this patent is extended or adjusted under 35 U.S.C. 154(b) by 0 days.

(21) Appl. No.: 16/930,446

(22) Filed: Jul. 16, 2020

(65) Prior Publication Data

US 2021/0018313 A1    Jan. 21, 2021

(30) Foreign Application Priority Data

Jul. 17, 2019 (JP) .............................. JP2019-131849
Jun. 16, 2020 (JP) .............................. JP2020-103723

(51) Int. Cl.
*G01B 11/00* (2006.01)
*G01B 11/14* (2006.01)
(Continued)

(52) U.S. Cl.
CPC ............ *G01B 11/002* (2013.01); *G01B 11/14* (2013.01); *G01D 5/34707* (2013.01); *G01D 5/34776* (2013.01); *G01D 5/38* (2013.01)

(58) Field of Classification Search
CPC ....... G01B 11/002; G01B 11/14; G01B 11/22; G01B 9/02041; G01B 9/02049;
(Continued)

(56) References Cited

U.S. PATENT DOCUMENTS 4,676,645 A * 6/1987 Taniguchi ................ G01D 5/38
                                                    250/237 G
5,499,096 A * 3/1996 Tamiya .................... G01D 5/38
                                                      356/494
(Continued)

FOREIGN PATENT DOCUMENTS

JP            2014134532 A       7/2014

*Primary Examiner* — Gordon J Stock, Jr.
(74) *Attorney, Agent, or Firm* — The Webb Law Firm

(57) ABSTRACT

In order to provide a small detection device capable of detecting an accurate absolute position with a single head, there is provided a detection device including a head including a light source and a detecting unit configured to receive multiplexed light (interference light) of diffracted light obtained by causing light from the light source to enter first two points residing on ax diffraction grating and being separated from each other by a known distance and diffracted light obtained by causing the light from the light source to enter second two points residing on the diffraction grating, being separated from each other by a known distance, and including at least one point being different from the first two points, wherein the diffraction grating includes a first region between the first two points separated from each other by the known distance and a second region between the second two points separated from each other by the known distance, the first and second regions having at least partially different grating interval lengths, and an absolute position on the diffraction grating is detected based on the multiplexed light (interference light) received by the detecting unit.

8 Claims, 9 Drawing Sheets

(51) Int. Cl.
*G01D 5/347* (2006.01)
*G01D 5/38* (2006.01)

(58) Field of Classification Search
CPC ........ G01B 9/0205; G01D 5/266; G01D 5/28; G01D 5/30; G01D 5/32; G01D 5/34; G01D 5/345; G01D 5/347; G01D 5/34707; G01D 5/34715; G01D 5/3473; G01D 5/34738; G01D 5/34746; G01D 5/36; G01D 5/245; G01D 5/2451; G01D 5/2452; G01D 5/2454; G01D 5/2455; G01D 5/2457; G01D 5/34753; G01D 5/34776; G01D 5/34784; G01D 5/34792; G01D 5/38
See application file for complete search history.

(56) References Cited

U.S. PATENT DOCUMENTS

| | | | | |
|---|---|---|---|---|
| 5,825,023 A | * | 10/1998 | Cai | G01D 5/34715 |
| | | | | 250/237 G |
| 6,879,405 B2 | * | 4/2005 | Tamiya | G01D 5/34792 |
| | | | | 250/231.13 |
| 7,034,948 B2 | * | 4/2006 | Tamiya | G01D 5/34707 |
| | | | | 250/231.16 |
| 7,738,112 B2 | * | 6/2010 | Tamiya | G01D 5/38 |
| | | | | 356/494 |
| 9,689,662 B2 | * | 6/2017 | Tamiya | G01D 5/34746 |
| 9,810,521 B2 | * | 11/2017 | Suzuki | G01B 9/0209 |
| 10,634,521 B2 | * | 4/2020 | Niiya | G01D 5/34792 |
| 2014/0195193 A1 | | 7/2014 | Tamiya | |
| 2020/0408571 A1 | * | 12/2020 | Niiya | G01D 5/34707 |

* cited by examiner

DETECTION DEVICE

CROSS-REFERENCE TO RELATED APPLICATIONS

This application claims priority to Japanese Patent Application Nos. 2019-131849 filed Jul. 17, 2019 and 2020-103723 filed Jun. 16 2020, the disclosures of which are hereby incorporated by reference in their entirety.

BACKGROUND OF THE INVENTION

Field of the Invention

The present invention relates to a detection device for detecting a position with a scale.

Description of Related Art

There has been a detection device for detecting a position on a scale based on interference light obtained by irradiating light onto the scale provided with a diffraction grating. With such a detection device, it is possible to detect a position on the scale based on phase information obtained according to a grating pitch of the diffraction grating. However, for example, in a case where the detection device is turned ON from OFF, it is impossible to determine an initial position at the time when the detection device is turned ON, and therefore it is impossible to detect an absolute position on the scale.

In order to deal with this, a detection device has been proposed that includes two displacement detecting units (heads) and that is capable of detecting an absolute position at any time based on a difference between the pieces of phase information obtained by the two displacement detecting units (heads) (for example, refer to JP 2014-134532 A).

SUMMARY OF THE INVENTION

However, since the detection device described in JP 2014-134532 A requires at least two displacement detecting units (heads) each including a light source, a detecting unit, a reflection mirror, and/or the like, the detection device can hardly be made small. In addition, in a case where the grating pitch of the diffraction grating is expressed by a second or higher-order polynomial, it is impossible to determine a single position based on the difference between the pieces of phase information obtained by the two displacement detecting units (heads). Thus, in order to determine a single absolute value at any time, the detection device needs to include more displacement detecting units (heads). This leads to a problem of further upsizing of the detection device.

The present invention was made in view of the problem described above, and has an object to provide a small detection device capable of detecting an accurate absolute position with a single head.

In order to attain the above object, a detection device according to one aspect of the present invention includes a head including a light source and a detecting unit configured to receive multiplexed light (interference light) of diffracted light obtained by causing light from the light source to enter first two points residing on a diffraction grating and being separated from each other by a known distance and diffracted light obtained by causing the light from the light source to enter second two points residing on the diffraction grating, being separated from each other by a known distance, and including at least one point being different from the first two points, in which the diffraction grating includes a first region between the first two points separated from each other by the known distance and a second region between the second two points separated from each other by the known distance, the first and second regions having at least partially different grating interval lengths, and an absolute position on the diffraction grating is detected based on the multiplexed light (interference light) received by the detecting unit.

It is possible to provide a small detection device capable of detecting an accurate absolute position with a single head.

DESCRIPTION OF THE INVENTION

Figure 1:
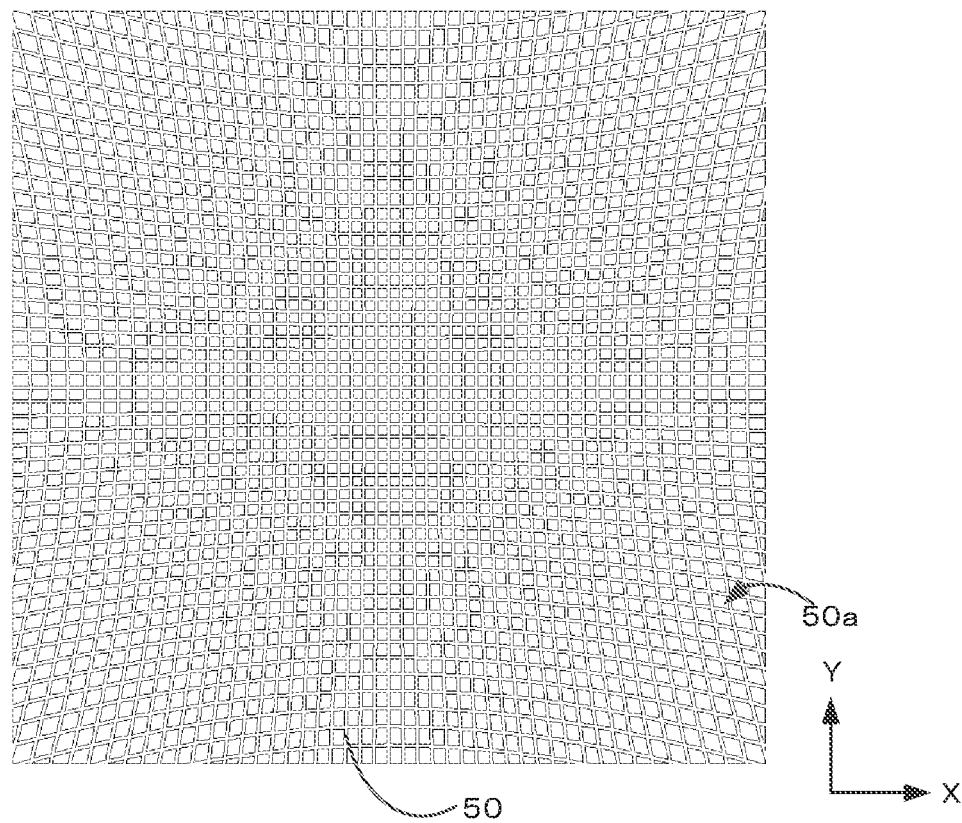
FIG. 1 is a plan view schematically showing an example of a scale provided with a grating having a distortion.

A detailed description will hereinafter be given of an embodiment of the present invention with reference to drawings. In the drawing, members having identical features have identical reference signs. For the purpose of clear explanation and easy understanding of the main points, embodiments will be presented separately for convenience. However, features of the different embodiments may be partially replaced with each other or combined with each other. In second and subsequent embodiments, matters in common with a first embodiment will not be described repeatedly. Described in the second and subsequent embodiments are only matters different from those of the first embodiment. In particular, similar effects achieved by similar features will not be described again in each embodiment.

The embodiments below will be shown to embody the technical ideas of the present invention. Unless otherwise particularly described, the present invention is not limited to the embodiments below. The sizes, positional relations, and the like of the members in the drawings may be occasionally shown in an exaggerated manner for clear explanation. In the description below, a surface of a scale placed on a horizontal plane is expressed by X and Y coordinates, and a vertical height direction thereof is expressed by a Z-axis.
(Detection Device and Control System According to One Embodiment of the Present Invention)

Figure 2:
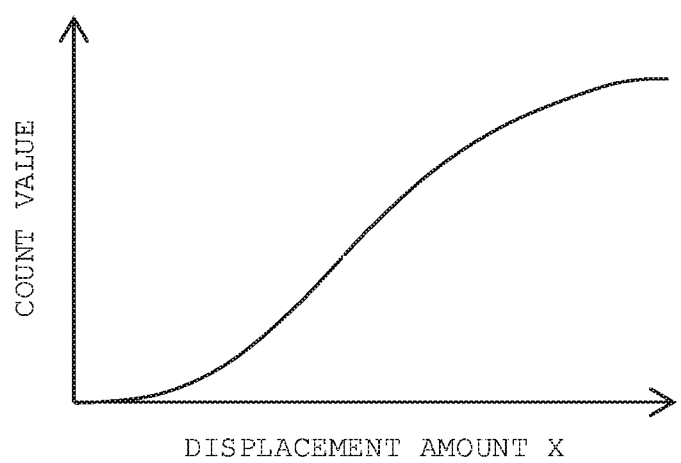
FIG. 2 is a graph showing a correlation between a displacement amount in an X-axis direction of the scale shown in FIG. 1 and phase information obtained according to a grating pitch.
Figure 3:
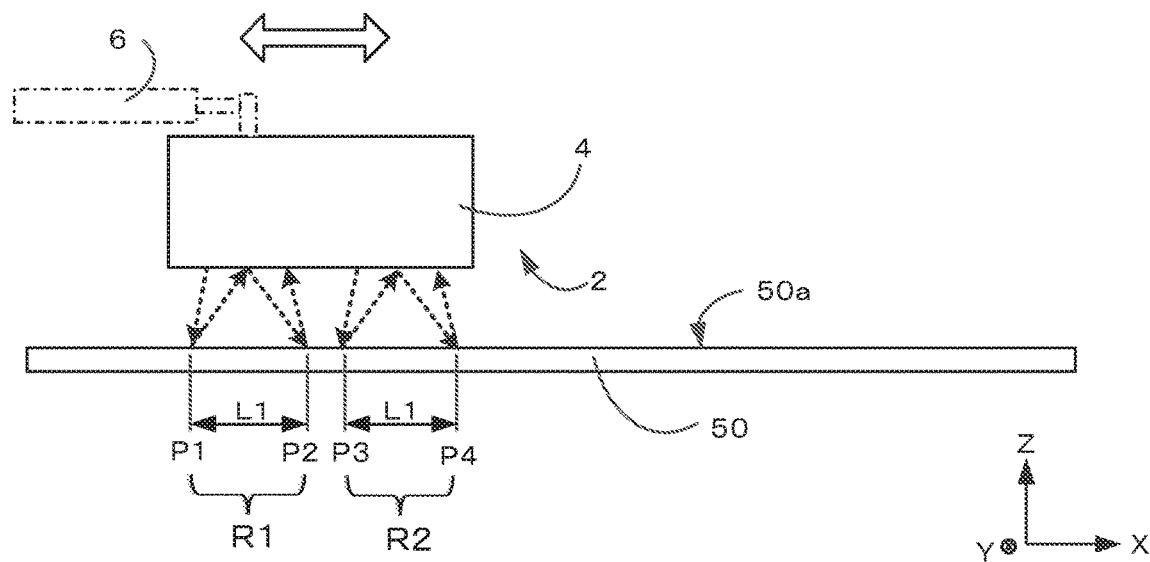
FIG. 3 is a side view schematically showing a detection device according to one embodiment of the present invention.
Figure 4:
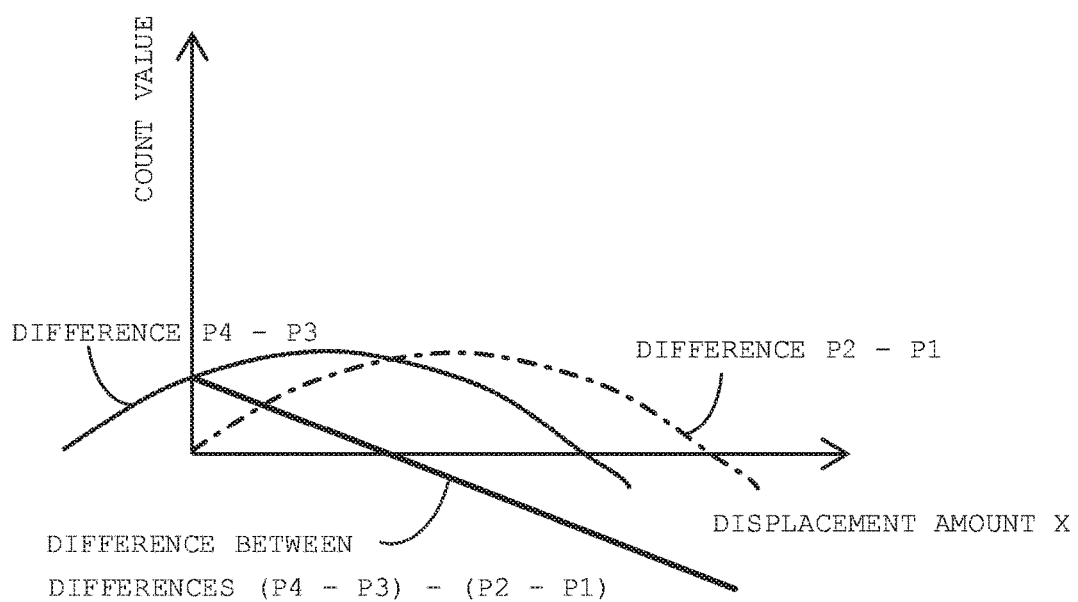
FIG. 4 is a graph showing a difference between differences yielded from pieces of phase information with respect to displacement amounts obtained by the detection device shown in FIG. 3.

First, with reference to FIGS. 1 to 4, the following will describe a detection device according to one embodiment of the present invention. FIG. 1 is a plane view schematically showing one example of a scale provided with a grating having a distortion. FIG. 2 is a graph showing a correlation between a displacement amount in an X-axis direction of the scale shown in FIG. 1 and phase information obtained according to the grating. FIG. 3 is a side view schematically showing a detection device according to one embodiment of the present invention. FIG. 4 is a graph showing a difference between differences yielded from pieces of phase information with respect to displacement amounts obtained by the detection device shown in FIG. 3.

A detection device 2 according to the present embodiment includes a head 4 and a moving mechanism 6 for causing the head 4 to move in an X-axis direction. The head 4 includes a light source and a detecting unit. Light emitted from the light source enters a diffraction grating provided to a detection surface 50a, which is an upper surface of a scale 50. Based on beams of diffracted light including pieces of phase information thus obtained or multiplexed light (interference light) thereof, phase information corresponding to the grating pitch of the diffraction grating or a difference of the phase information is obtained.

A control unit of the detection device 2 controls an actuator of the moving mechanism 6 to control movement of the head 4. Employed as the actuator of the moving mechanism 6 is an actuator whose position can be accurately controlled by the control unit, such as a stepping motor. With this, the control unit can accurately grasp a displacement amount X of the head 4 on the scale 50.

In the present embodiment, the moving mechanism 6 causes the head 4 to move. However, this is not limited thereto. Alternatively, the moving mechanism 6 may cause the scale 50 to move. Further alternatively, the moving mechanism 6 may cause both of the head 4 and the scale 50 to move. The detection device 2 may not include the moving mechanism. Alternatively, the head 4 and the scale 50 may be moved relatively by a moving mechanism of equipment to which the head 4 and the scale 50 are attached.
<Scale>

The detection surface 50a of the scale 50 of the present embodiment has a plurality of slits, which constitutes a diffraction grating. The scale 50 described herein has a reflection-type diffraction grating. Alternatively, the scale 50 may have a transmission-type diffraction grating.

The detection surface 50a of the scale 50 has slits arranged at a predetermined interval in the X-axis direction. In the present embodiment, the grating pitch of the diffraction grating is set so that the grating pitch can be approximated by a second-order polynomial with respect to coordinates.

With such a grating pitch of the diffraction grating, a relation between a displacement amount X of the head 4 in the X-axis direction and phase information at the displacement amount X can be approximated by a third-order polynomial ($S=-aX^3+bX^2+cX+d$) (see FIG. 2).

A grating pattern of the diffraction grating of the present embodiment has a density that increases with increasing proximity from one end in the X-axis direction toward a center and decreases with increasing proximity from the center toward another end in the X-axis direction. Also in a Y-axis direction orthogonal to the X-axis direction, phase information can be approximated by a third-order polynomial in a similar manner, and the grating pattern of the diffraction grating has a density that increases with increasing proximity from one end toward a center and decreases with increasing proximity from the center toward another end. That is, the scale 50 according to the present embodiment can be deemed as including a grating having a distortion. The diffraction grating may alternatively have a pattern having a density that decreases with increasing proximity from one end toward the center and increases with increasing proximity from the center toward another end.

The following will give a supplemental explanation on the configuration of obtaining the phase information according to the grating pitch of the diffraction grating based on the beams of diffracted light including the pieces of phase information or multiplexed light (interference light) thereof.

That is, light is emitted to the diffraction grating, and a signal is outputted based on the resulting diffracted light. For example, from two-phase sign waves generated as a result of interference of negative first-order diffracted light and positive first-order diffracted light, it is possible to obtain a signal cycle corresponding to one-half of the grating interval. For another example, use of an optical system can give a signal cycle corresponding to one-quarter of the grating interval. By dividing the signal with an interpolation circuit, it is possible to obtain phase information with a higher resolution.
<Detection of Absolute Position Based on Phase Information>

In the present embodiment, as shown in FIG. 3, by a certain displacement amount X of the head 4, it is possible to obtain beams of diffracted light including pieces of phase information at four points, i.e., point P1 and point P2 that are separated from each other by a known distance L1 and point P3 and point P4 that are separated from each other by the known distance L1. Consequently, it is possible to obtain a difference (P2–P1) between a piece of phase information at point P2 and a piece of phase information at point P1 and a difference (P4–P3) between a piece of phase information at point P4 and a piece of phase information at point P3. A space between points P1 and P2 separated from each other by the distance L1 is referred to as a first region R1, whereas a space between points P3 and P4 separated from each other by the distance L1 is referred to as a second region R2.

FIG. 4 shows, by the dotted-and-dashed line, a difference (P2–P1) between pieces of phase information at points P2 and P1 with respect to the displacement amount X. Similarly, FIG. 4 shows, by the dotted line, a difference (P4–P3) between pieces of phase information at points P4 and P3 with respect to the displacement amount X. Each of these differences is indicated by a curved line expressing a quadratic function obtained by differentiating phase information represented by a cubic function.

In the present embodiment, the grating pitch of the diffraction grating varies so as to have a density that increases with increasing proximity from one end toward the center and decreases with increasing proximity from the center toward another end in the X-axis direction and to provide phase information expressed by a third-order polynomial.

With a grating pattern with which a single absolute position is determined based on a difference in grating interval length even if two regions (a first region R1 and a second region R2) are at any locations on the diffraction grating, it is possible to provide a highly reliable detection device 2 capable of reliably detecting an absolute position on the diffraction grating. With the diffraction grating whose grating pitch can be approximated by a second-order polynomial, by obtaining phase information at a certain displacement amount, it is possible to determine whether it is in a region where the density of the grating pattern increases or a region where the density of the grating pattern decreases. Thus, based on the differences between the grating interval lengths, it is possible to determine a single absolute position in the entire region. The grating pattern that can be approximated by a second-order polynomial can be formed in an efficient manner, and therefore is favorable in terms of a manufacturing cost and the like.

However, if it is impossible to determine whether it is in the region where the density of the grating pattern increases or the region where the density of the grating pattern decreases, it is impossible to determine a single absolute position, since differences between pieces of phase information at points that are equidistantly away from the center of the grating pattern (i.e., points at symmetric positions) are equal to each other. In order to deal with this, the present embodiment further obtains a difference between the differences, thereby making it possible to detect an absolute position at any time.

FIG. 4 shows, by the solid line, a difference ((P4−P3)−(P2−P1)) between the difference (P4−P3) and the difference (P2−P1) with respect to the displacement amount X. The difference between the differences is indicated by a straight line representing a linear function obtained by differentiating the difference between the pieces of phase information represented by a quadratic function. Thus, a point traversing the X-axis, where the difference between the differences is zero, corresponds to the densest point in the diffraction grating having a distortion. Thus, it is possible to grasp the displacement amount and the phase information at the detection position as well as the displacement amount and the phase information at the densest point on the diffraction grating. Consequently, it is possible to detect an absolute position in the X-axis direction based on the phase information at any time.

As described above, pieces of phase information on the grating are determined based on the grating interval lengths, the pieces of phase information are obtained from beams of diffracted light from two points residing on each of the two regions (the first region R1 and the second region R2) and being separated from each other by the known distance L1, and an absolute position on the diffraction grating can be detected based on a difference between differences yielded from the pieces of phase information obtained from the beams of diffracted light. With this, it is possible to reliably detect the absolute position on the diffraction grating with use of the single head 4.

Particularly, with a configuration in which each of the pieces of phase information on the grating is approximated by a cubic expression and the difference between the differences yielded from the pieces of phase information obtained from the beams of diffracted light is approximated by a linear expression, it is possible to detect the absolute position easily and efficiently.

As described above, with the diffraction grating having the grating pattern whose density decreases with increasing proximity from one end toward the center and increases with increasing proximity from the center toward another end, a scale for detecting an absolute position can be formed in an efficient manner.

Also in the Y-axis direction, the scale 50 has a similar grating pattern. Therefore, it is possible to detect an absolute position in the Y-axis direction based on the phase information at any time in a similar manner. The foregoing has described the example where the scale 50 has the diffraction grating whose grating pitch can be approximated by a second-order polynomial. Alternatively, a diffraction grating whose grating pitch can be approximated by a third-order polynomial or a first-order polynomial may be adopted, as long as the diffraction grating has a density that varies, specifically, increases and decreases. Further alternatively, any grating pattern may be adopted, as long as the grating pattern has at least partially different grating interval lengths and an absolute position on the diffraction grating can be detected based on beams of diffracted light received from two regions (a first region R1 and a second region R2).

The following will give a detailed explanation of a specific embodiment of the head 4 for detecting an absolute position based on a difference between differences ((P4−P3)−(P2−P1)).

(Head According to First Embodiment)

Figure 5:
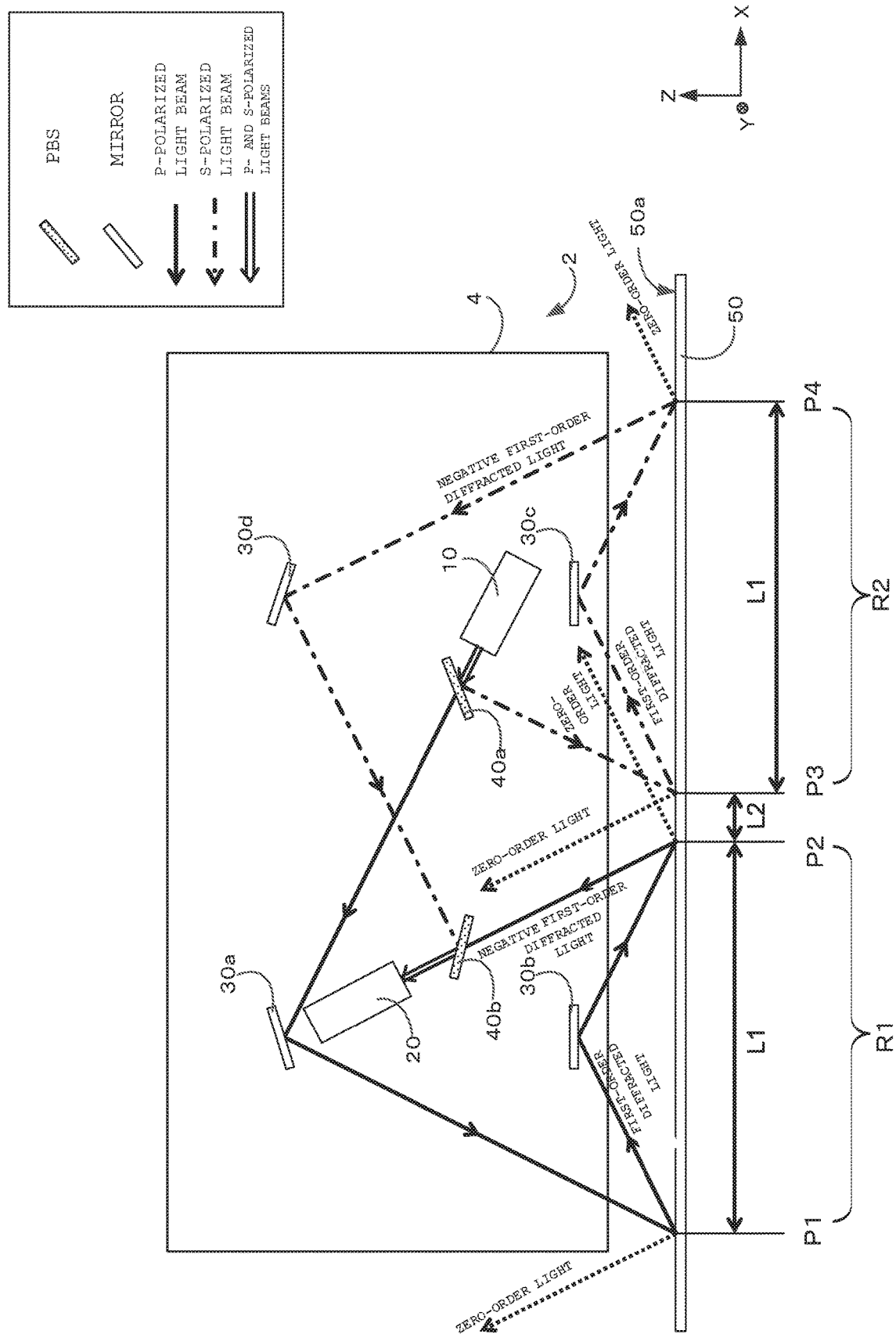
FIG. 5 is a view schematically showing a configuration of a head according to a first embodiment of the present invention and a way in which light travels.

First, with reference to FIG. 5, the following will describe a head according to the first embodiment of the present invention. FIG. 5 is a view schematically showing a configuration of the head according to the first embodiment of the present invention and a way in which light travels.

A head 4 according to the present embodiment includes a light source 10 and a detecting unit 20 for receiving diffracted light obtained by causing light from the light source 10 to enter a diffraction grating on a detection surface 50a of a scale 50. In addition, the head 4 includes an optical system including four mirrors 30a, 30b, 30c, and 30d and two polarization beam splitters (PBS) 40a and 40b.

As the light source 10, a light-emitting diode (LED) or a laser diode (LD) may be employed. The light source 10 includes an optical system, such as a collimating lens and/or a condensing lens. As the detecting unit 20, a light receiving element such as a charge-coupled device (CCD), a complementary metal oxide semiconductor (CMOS), or a photodetector (PD) may be employed. The detecting unit 20 includes an optical system such as a polarizing beam splitter (PBS), a nonpolarizing beam splitter (NPBS), a polarizing plate, a collimating lens, and/or a condensing lens.

With use of the optical system arranged therein, in a first region R1 between two points (point P1, point P2) separated from each other by a known distance L1, the head 4 including the single light source 10 and the single detecting unit 20 causes polarized light (e.g., P-polarized light) of light from the light source 10 to enter the diffraction grating at one point (P1), and causes the resulting positive first-order diffracted light to enter the diffraction grating at the other point (P2). Consequently, first diffracted light including phase information "P2−P1" is obtained.

Similarly, in a second region R2 between two points (point P3, point P4) separated from each other by the known distance L1, the head 4 causes polarized light (e.g., S-polarized light) of the light from the light source 10 to enter the diffraction grating at one point (P3), and causes the resulting positive first-order diffracted light to enter the diffraction grating at the other point (P4). Consequently, second diffracted light including phase information "P4−P3" is obtained.

Then, the detecting unit 20 receives multiplexed light (interference light) of the first diffracted light and the second diffracted light. Based on a difference between differences yielded from pieces of phase information thus obtained, it is possible to detect an absolute position on the scale 50. In the first embodiment, point P2 and point P3 are separated from each other by a known distance L2, i.e., the first region R1 and the second region R2 are separated from each other by the known distance L2.

<Way in Which Light Travels>

The following will give a detailed explanation of a way in which light from the head 4 according to the first embodiment travels.

Beams of P- and S-polarized light are emitted from the light source 10 in a left upper direction in FIG. 5 (see the double-line arrow), and enter a polarization beam splitter (PBS) 40*a*. The P-polarized light passes through the polarization beam splitter (PBS) 40*a* and travels straight (see the solid line arrow). Meanwhile, the S-polarized light is reflected by the polarization beam splitter (PBS) 40*a*, and travels in a left lower direction in FIG. 5 (see the dotted-and-dashed line arrow).

<Traveling of Light in First Region R1>

The P-polarized light having traveled straight is reflected by the mirror 30*a* so as to travel in a left lower direction in FIG. 5, and then enters the detection surface 50*a* of the scale 50. Then, first-order diffracted light travels in a positive first-order direction, i.e., in a right upper direction in FIG. 5. Consequently, positive first-order diffracted light including phase information at point P1 is obtained. It is noted that zero-order light at point P1 is reflected to travel in a left upper direction in FIG. 5, and travels to the outside of the head 4. That is, the zero-order light would not enter the detecting unit 20.

The positive first-order diffracted light having traveled from the detection surface 50*a* of the scale 50 in the right upper direction in FIG. 5 enters the mirror 30*b* disposed such that its reflection surface is horizontal, and is reflected to travel in a right lower direction in FIG. 5. The positive first-order diffracted light having been reflected to travel in the right lower direction in FIG. 5 enters the detection surface 50*a* of the scale 50. Then, negative first-order diffracted light of the positive first-order diffracted light travels in a left upper direction in FIG. 5. This yields diffracted light additionally including phase information at point P2. The diffracted light that is P-polarized light and that includes the phase information at point P1 and the phase information at point P2 is referred to as first diffracted light. It is noted that zero-order light at point P2 is reflected to travel in a right upper direction in FIG. 5. That is, the zero-order light would not enter the detecting unit 20.

Since the first diffracted light traveling from the detection surface 50*a* of the scale 50 in the left upper direction in FIG. 5 is P-polarized light, the first diffracted light passes through the polarization beam splitter (PBS) 40*b*. Consequently, the first diffracted light becomes a part of multiplexed light (interference light) entering the detecting unit 20.

<Traveling of Light in Second Region R2>

The S-polarized light having been reflected by the polarization beam splitter (PBS) 40*a* to travel in the left lower direction in FIG. 5 enters the detection surface 50*a* of the scale 50. Then, the first-order diffracted light travels in a positive first-order direction, i.e., in a right upper direction in FIG. 5. Consequently, positive first-order diffracted light including phase information at point P3 is obtained. It is noted that zero-order light at point P3 is reflected to travel in a left upper direction in FIG. 5. That is, the zero-order light would not enter the detecting unit 20.

The positive first-order diffracted light having traveled from the detection surface 50*a* of the scale 50 in the right upper direction in FIG. 5 enters the mirror 30*c* disposed such that its reflection surface is horizontal, and is reflected to travel in a right lower direction in FIG. 5. The positive first-order diffracted light having been reflected to travel in the right lower direction in FIG. 5 enters the detection surface 50*a* of the scale 50. Then, negative first-order diffracted light of the positive first-order diffracted light travels in a left upper direction in FIG. 5. This yields diffracted light additionally including phase information at point P4. The diffracted light that is S-polarized light and that includes the phase information at point P3 and the phase information at point P4 is referred to as second diffracted light. It is noted that zero-order light at point P4 is reflected to travel in a right upper direction in FIG. 5 so as to travel to the outside of the head 4. That is, the zero-order light would not enter the detecting unit 20.

The second diffracted light traveling from the detection surface 50*a* of the scale 50 in the left upper direction in FIG. 5 is reflected by the mirror 30*d* so as to travel in a left lower direction in FIG. 5, and enters the polarization beam splitter (PBS) 40*b*. Since the second diffracted light is S-polarized light, the second diffracted light is reflected by the polarization beam splitter (PBS) 40*b*, so as to become a part of the multiplexed light (interference light) entering the detecting unit 20.

In the above-described manner, the multiplexed light (interference light) of the first diffracted light that is P-polarized light and that includes the phase information at point P1 and the phase information at point P2 and the second diffracted light that is S-polarized light and that includes the phase information at point P3 and the phase information at point P4 enters the detecting unit 20 (see the double-line arrow).

From the multiplexed light (interference light), it is possible to obtain a difference ((P4−P3)−(P2−P1)) between differences, which is a difference between a difference (P4−P3) between the phase information at point 4 and the phase information at point 3 and a difference (P2−P1) between the phase information at point 2 and the phase information at point 1. By use of the difference between the differences of the pieces of phase information, it is possible to detect an absolute position in the X-axis direction with respect to the scale 50.

In the present embodiment, the positive first-order diffracted light and the negative first-order diffracted light are employed. However, this is one example. Alternatively, second or higher-order diffracted light may be employed. In the present embodiment, the negative diffracted light is obtained by causing the positive diffracted light to enter the diffraction grating. Reversely, positive diffracted light can be obtained by causing negative diffracted light to enter the diffraction grating. That is, positive or negative M-th order diffracted light (M is an integer equal to or greater than 1) obtained by causing polarized light to enter the diffraction grating at one point (P1, P3) may be caused to enter the diffraction grating at the other point (P2, P4), so as to yield negative or positive M-th first or second diffracted light.

(Alternative Example of the First Embodiment)

Figure 9:
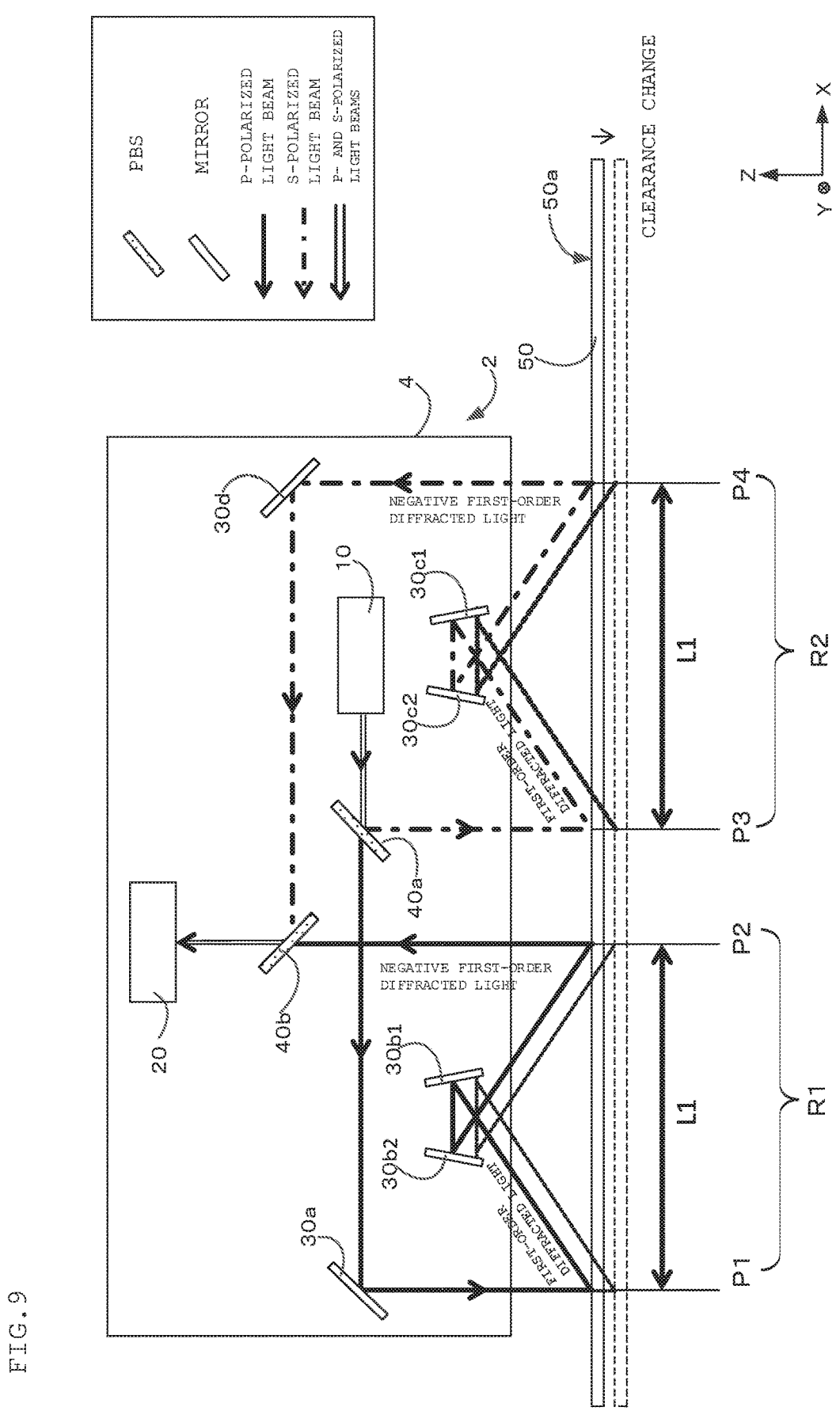
FIG. 9 is a view schematically showing a configuration of the head according to an alternative example of the first embodiment of the present invention and a way in which light travels.

Next, with reference to FIG. 9, the following will describe a head according to an alternative example of the first embodiment of the present invention. FIG. 9 is a view schematically showing a configuration of the head according to the alternative example of the first embodiment of the present invention and a way in which light travels. It is noted that an arrow showing zero-order light is omitted in FIG. 9. The alternative example shown in FIG. 9 is different from the first embodiment shown in FIG. 5 on the following points.

In the alternative example, beams of P- and S-polarized light are emitted from the light source 10 in a direction to be parallel to the detection surface 50a of the scale 50a, i.e., in a left direction in FIG. 9 (see the double-line arrow). The P-polarized light that passes through the polarization beam splitter (PBS) 40a and travels straight in a left direction. Then, the P-polarized light is reflected by the mirror 30a so as to travel in a lower direction, which is vertical to the detection surface 50a of the scale 50, and then enters the point P1 of the detection surface 50a of the scale 50 (see the solid line arrow). A positive first-order direction that positive first-order light travels has more angle to the detection surface 50a compared to the first embodiment shown in FIG. 5. Therefore, in order to cause the positive first-order diffracted light from the point P1 to enter again the point P2 of the detection surface 50a of the scale 50 located at L1 distance, the head according to the alternative example has two mirrors 30b1, b2 that have certain angles to the detection surface 50a instead of the horizontal mirror of the first embodiment. The positive first-order light from the point P1 is reflected twice by the mirrors 30b1, b2, and then enters the point 2 of the detection surface 50a of the scale 50. Then, negative first-order light travels in a direction to be vertical to the detection surface 50a of the scale 50 i.e., in an upper direction in FIG. 9, and passes through the polarization beam splitter (PBS) 40b and becomes a part of multiplexed light (interference light), and then travels further in the upper direction and enters the detecting unit 20 (see the double-line arrow).

In the beams of P- and S-polarized light that are emitted from the light source 10 in a left direction in FIG. 9, S-polarized light is reflected by the polarization beam splitter (PBS) 40a and travels in a direction to be vertical to the detection surface 50a of the scale 50, i.e., in a lower direction in FIG. 9, and then enters the point P3 of the detection surface 50a of the scale 50 (see the solid line arrow). A positive first-order direction that positive first-order light travels has more angle to the detection surface 50a compared to the first embodiment shown in FIG. 5. Therefore, in order to cause the positive first-order diffracted light from the point P3 to enter again the point P4 on the detection surface 50a of the scale 50 located at L1 distance, the head according to the alternative example has two mirrors 30c1, c2 that have certain angles to the detection surface 50a, to be similar to the above. The positive first-order light from the point P3 is reflected twice by the mirrors 30c1, c2, and then enters the point 4 of the detection surface 50a of the scale 50. Then, negative first-order light travels in a direction to be vertical to the detection surface 50a of the scale 50 i.e., in an upper direction in FIG. 9, and is reflected by a mirror 30d and travels in a left direction in FIG. 9. The negative first-order light is reflected by the polarization beam splitter (PBS) 40b and becomes a part of multiplexed light (interference light), and then travels further in the upper direction and enters the detecting unit 20 (see the double-line arrow).

In the alternative example shown FIG. 9, in both beams of P- and S-polarized light, positive first-order light enters the detection surface 50a of the scale 50 in a vertical direction thereto, and negative first-order light travels from the detection surface 50a of the scale 50 in a vertical direction thereto. Therefore, even if the detection surface 50a of the scale 50 moves in an upper or lower direction in FIG. 9 (see the dotted line), negative first-order light travels from the point P2 and the point P4 in a direction to be vertical to the detection surface 50a of the scale 50, i.e., in an upper direction in FIG. 9, and always enters the detecting unit 20 as far as the first-order light enters the reflecting surface of the mirrors 30b1, 30b2, 30c1 and 30c2. Accordingly, in the alternative example, even if a clearance of the detection surface 50a of the scale 50 changes, it can be absorbed and a precise detection can surly be performed.

(Head According to Second Embodiment)

Figure 6:
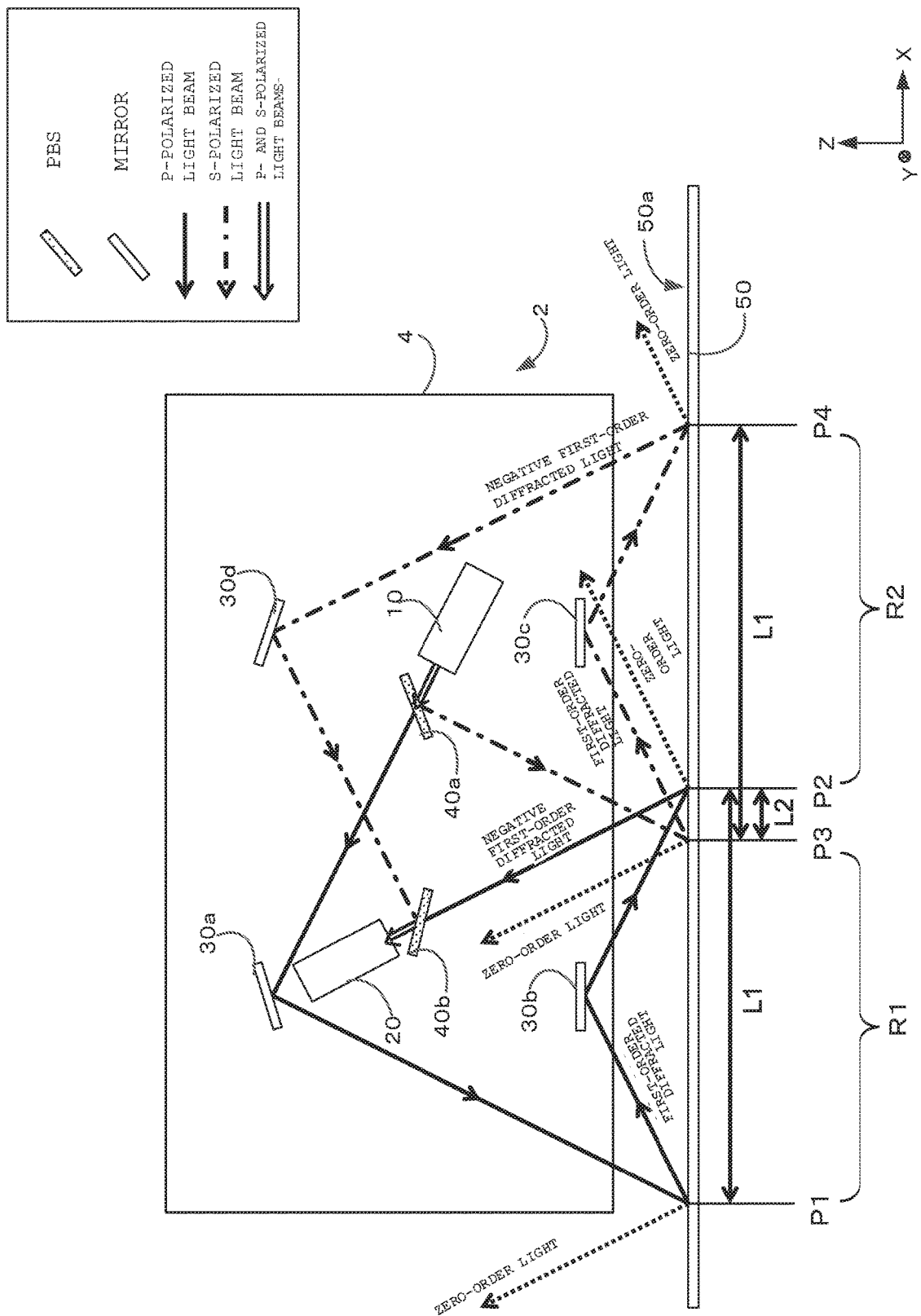
FIG. 6 is a view schematically showing a configuration of a head according to a second embodiment of the present invention and a way in which light travels.

Next, with reference to FIG. 6, the following will describe a head according to a second embodiment of the present invention. FIG. 6 is a view schematically showing a configuration of the head according to the second embodiment of the present invention and a way in which light travels.

In a head 4 according to the second embodiment, points P2 and P3 separated from each other by a distance L2 are arranged in a way opposite to that of the first embodiment. In terms of this, the head 4 of the second embodiment differs from the head 4 of the first embodiment. It is noted that a length of a first region R1 between points P1 and P2 and a length of a second region R2 between points P3 and P4 in the second embodiment are each set at L1, which is identical to that in the first embodiment. That is, in the second embodiment, the first region R1 and the second region R2 partially overlap each other.

More specifically, in the second embodiment, P1, P3 separated from P1 by a distance L1-L2, P2 separated from P3 by a distance L2, and P4 separated from P2 by a distance L1-L2 are arranged in this order from the left to the right in FIG. 6. The distance L2 may have any value in a range smaller than L1. With this, L1-L2 yields a positive value at any time. Other than these points, the second embodiment is similar to the first embodiment.

With the above-described arrangement, P-polarized light having passed through a polarization beam splitter (PBS) 40a and S-polarized light having been reflected by the polarization beam splitter (PBS) 40a travel in similar manners to those of the first embodiment. With this arrangement, the P-polarized light and the S-polarized light would not interfere with each other in a region between point P2 and point P3.

Consequently, also in the second embodiment, it is possible to obtain a difference ((P4−P3)−(P2−P1)) between differences in a similar manner to that of the first embodiment. With use of the difference between the differences, it is possible to detect an absolute position in an X-axis direction on with respect to the scale 50. In the second embodiment, a distance between point P1, which is located at a left-most location in FIG. 6, and point P4, which is located at a right-most location in FIG. 6, can be made shorter by 2×L2, as compared to the first embodiment.

(Head According to Third Embodiment)

Figure 7A:
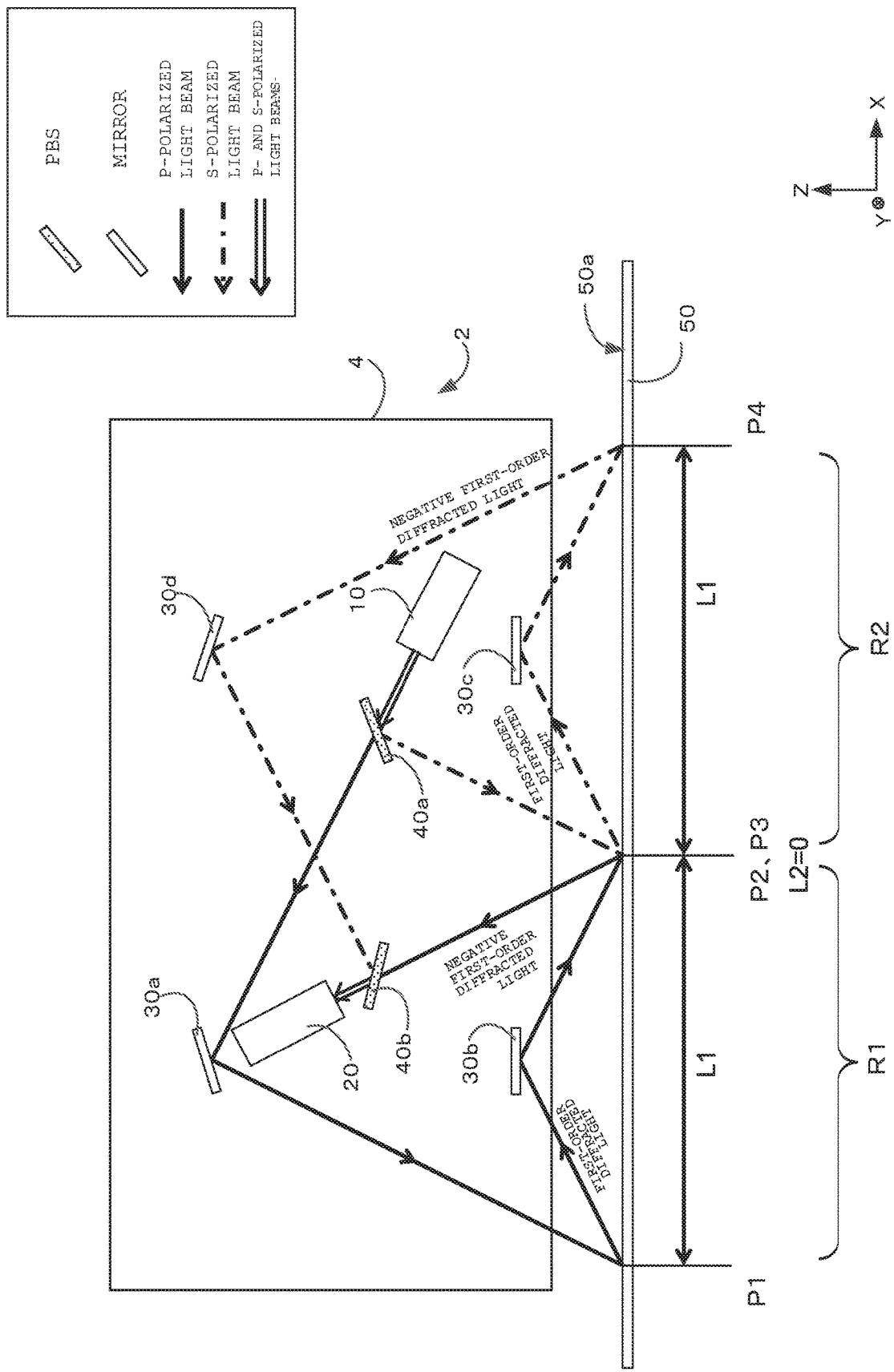
FIG. 7A is a view schematically showing a configuration of a head according to a third embodiment of the present invention and a way in which light travels.
Figure 7B:
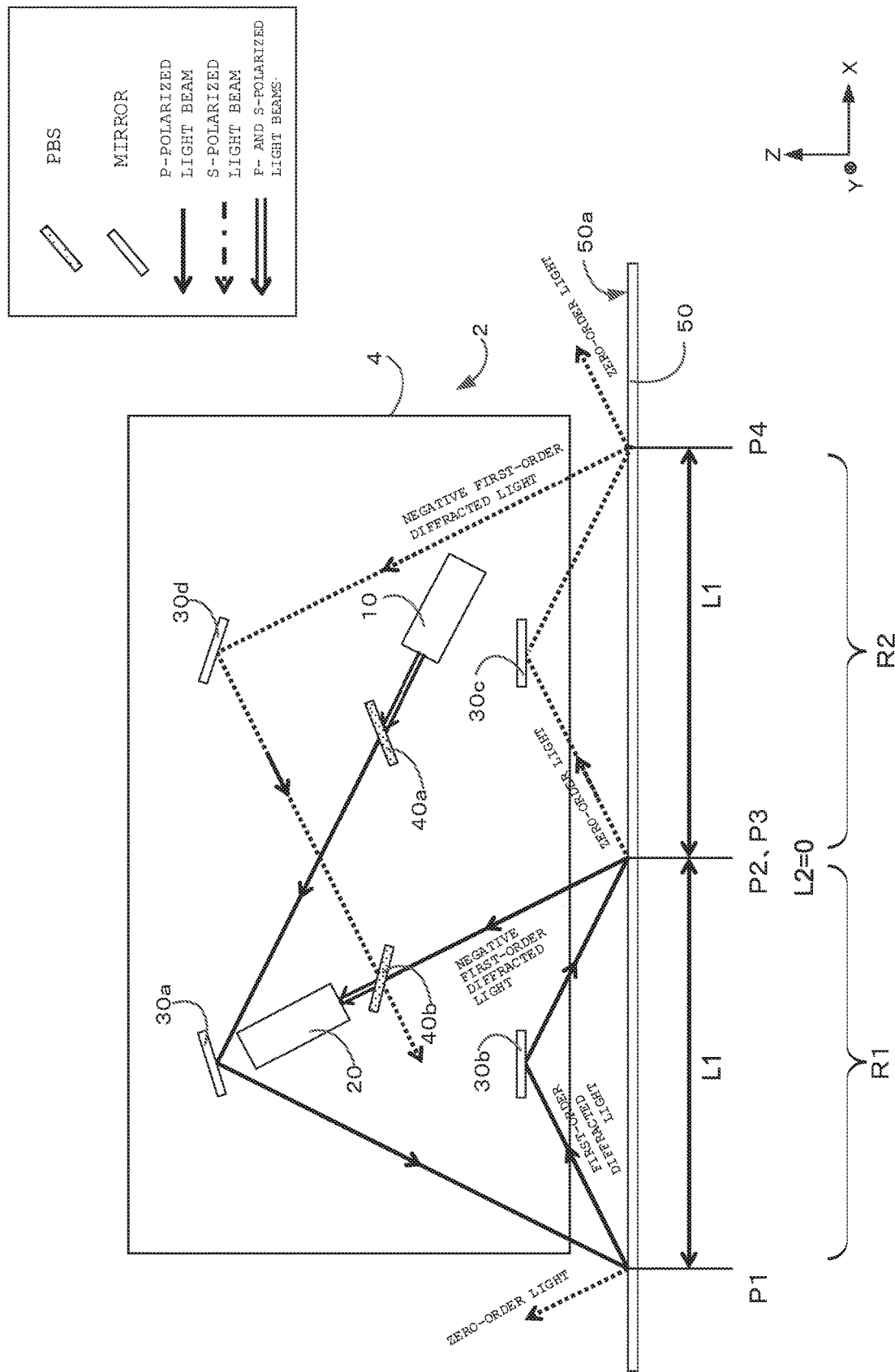
FIG. 7B is a view schematically showing a way in which P-polarized light travels according to the embodiment shown in FIG. 7A.
Figure 7C:
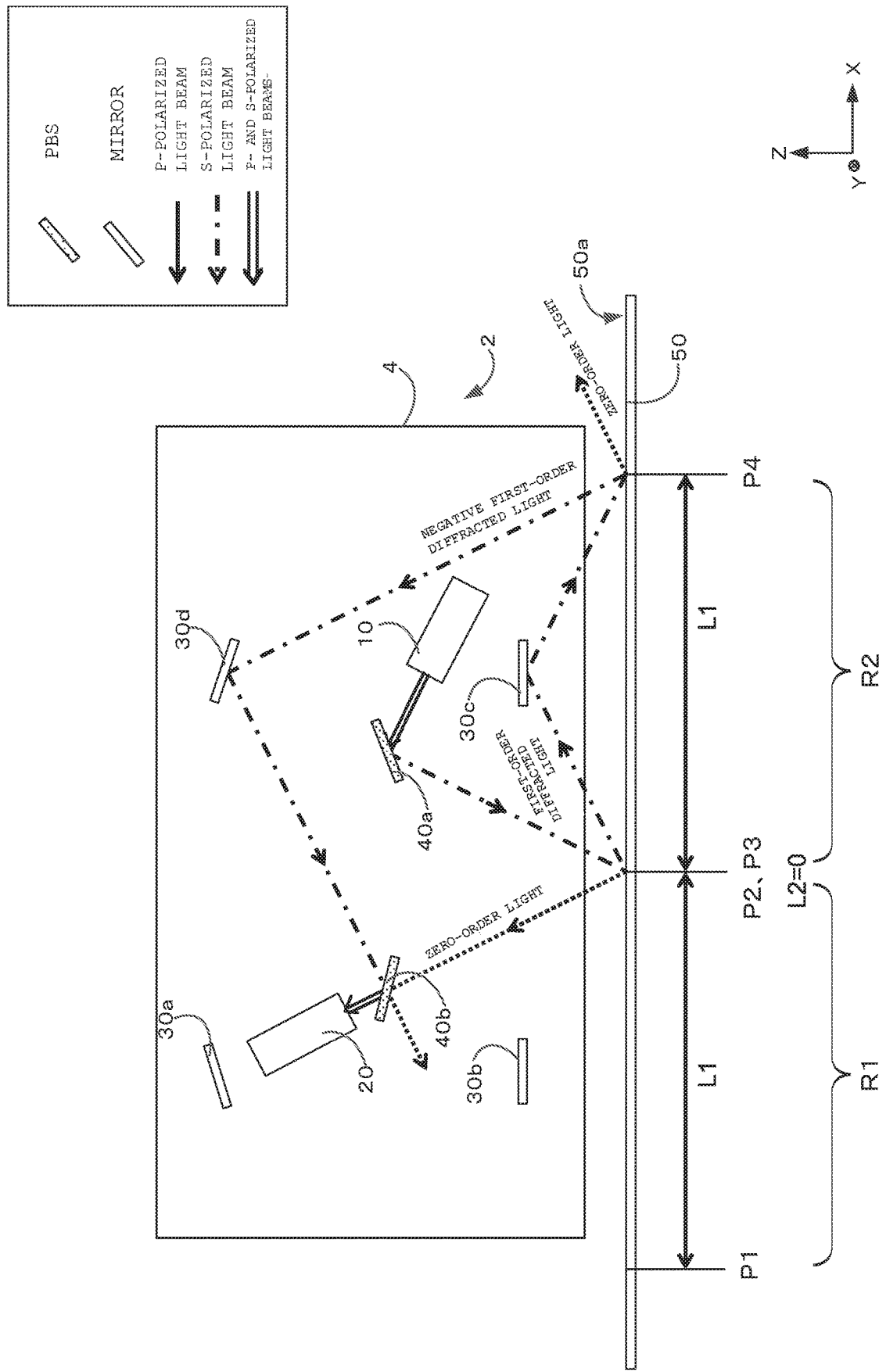
FIG. 7C is a view schematically showing a way in which S-polarized light travels according to the embodiment shown in FIG. 7A.

Next, with reference to FIGS. 7A, 7B, and 7C, the following will describe a head according to a third embodiment of the present invention. FIG. 7A is a view schematically showing a configuration of the head according to the third embodiment of the present invention and a way in which light travels. FIG. 7B is a view schematically showing a way in which P-polarized light travels according to the embodiment shown in FIG. 7A. FIG. 7C is a view schematically showing a way in which S-polarized light travels according to the embodiment shown in FIG. 7A.

In a head 4 according to the third embodiment, a distance L2 between points P2 and P3 is zero. In this point, the third embodiment differs from the first and second embodiments. That is, in the third embodiment, a first region R1 and a second region R2 are arranged so as to be continuous with each other, i.e., point P2 and point P3 are a single point. It is noted that a length of the first region R1 between points P1 and P2 and a length of the second region R2 between points P3 and P4 are each set at L1, which is identical to that in the first embodiment.

More specifically, in the third embodiment, point P1, point P2 (P3) separated from P1 by a distance L1, are point P4 separated from P3 (P2) by the distance L1 are arranged in this order from the left to the right in FIG. 7. Other than these points, the third embodiment is similar to the first and second embodiments.

The arrangement of points P1 to P4 in the first to third embodiments can be summarized as below. That is, points P1 to P4 are arranged such that diffracted light can be obtained by causing light from a light source to enter two points (e.g., points P1 and P2) residing on a diffraction grating and being separated from each other by a known distance L1 and diffracted light can be obtained by causing the light from the light source 10 to enter two points (e.g., points P2 (=P3) and P4) residing on the diffraction grating and being separated from each other by the known distance L1, the latter two points including at least one point being different from the former two points.

As described above, in the arrangement 2, the way in which the P-polarized light having passed through the polarization beam splitter (PBS) 40a travels and the way in which the S-polarized light having been reflected by the polarization beam splitter (PBS) 40a travels are similar to those in the first and second embodiments. However, in a case of L2=0, zero-order light of the P-polarized light generated at point P2 (P3) overlaps an optical path constituting second diffracted light of the S-polarized light, as shown in FIG. 7B. However, use of a light source having an adequately short coherence distance yields two polarization components that are orthogonal to each other and do not interfere with each other. Since the zero-order light having been reflected by the mirror 30d is P-polarized light, the zero-order light passes through the polarization beam splitter (PBS) 40a, and would not enter the detecting unit 20.

Similarly, zero-order light of the S-polarized light generated at point P3 (P2) also overlaps an optical path constituting first diffracted light of the P-polarized light, as shown in FIG. 7C. However, use of a light source having an adequately short coherence distance yields two polarization components that are orthogonal to each other and do not interfere with each other. Since the zero-order light generated at point P3 (P2) is S-polarized light, the zero-order light is reflected by the polarization beam splitter (PBS) 40a, and would not enter the detecting unit 20.

Consequently, also in the third embodiment, it is possible to obtain a difference ((P4−P3)−(P2−P1)) between differences in a similar manner to those of the first and embodiments. With use of the difference between the differences, it is possible to detect an absolute position in an X-axis direction with respect to the scale 50. In the third embodiment, a distance between point P1, which is located at a left-most location in FIG. 7, and point P4, which is located at a right-most location in FIG. 7, can be made shorter by L2, as compared to the first embodiment.

(Head According to Fourth Embodiment)

Figure 8:
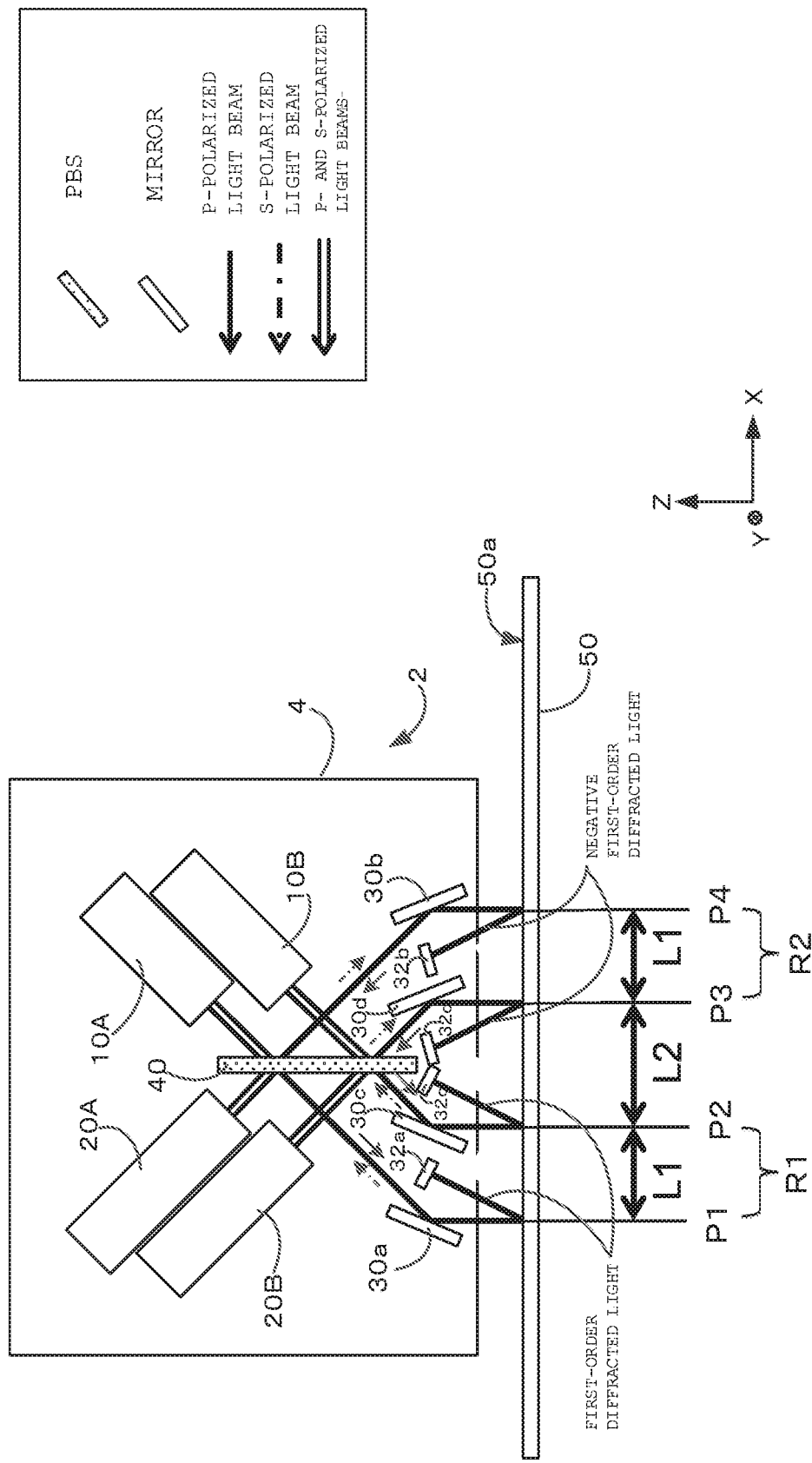
FIG. 8 is a view schematically showing a configuration of a head according to a fourth embodiment of the present invention and a way in which light travels.

Next, with reference to FIG. 8, the following will describe a head according to a fourth embodiment of the present invention. FIG. 8 is a view schematically showing a configuration of the head according to the fourth embodiment of the present invention and a way in which light travels.

The first to third embodiments described above have constituent members (the light source 10, the detecting unit 20, the mirrors 30a, 30b, 30c, and 30d, and the polarization beam splitters (PBS) 40a and 40b) in common. However, constituent elements of a head 4 according to the fourth embodiment are different from those of the first to third embodiments.

The head 4 according to the fourth embodiment includes two light sources 10A and 10B and detecting units 20A and 20B associated with the light sources 10A and 10B, respectively. In addition, the head 4 includes an optical system including a polarization beam splitter (PBS) 40, the mirrors 30a and 30b, and reflecting wavelength plates 32a and 32b arranged on an optical path from the first light source 10A to the first detecting unit 20A. Similarly, on an optical path from the second light source 10B to the second detecting unit 20B, the polarization beam splitter (PBS) 40, the mirrors 30c and 30d, and reflecting wavelength plates 32c and 32d are arranged.

Points P1 to P4, at which beams of diffracted light are obtained, are arranged in a similar manner to that of the first embodiment described above. P1, P2 separated from P1 by a distance L1, P3 separated from P2 by a distance L2, and P4 separated from P3 by the distance L1 are arranged in this order from the left to the right in FIG. 8. That is, a first region R1 between point P1 and point P2 separated from each other by the known distance L1 and a second region R2 between point P3 and point P4 separated from each other by the known distance L1 are separated from each other by the known distance L2.

The head 4 includes the first light source 10A and the first detecting unit 20A, which is associated with the first light source 10A, as well as the second light source 10B and the second detecting unit 20B, which is associated with the second light source 10B. The first detecting unit 20A receives multiplexed light (interference light) of diffracted light including phase information +2kxP1 obtained by causing light from the first light source 10A to enter the diffracting grating at point P1 and diffracted light including phase information −2kxP4 obtained by causing the light from the first light source 10A to enter the diffracting grating at point P4. Similarly, the second detecting unit 20B receives multiplexed light (interference light) of diffracted light including phase information +2kxP2 obtained by causing light from the second light source 10B to enter the diffracting grating at point P2 and diffracted light including phase information −2kxP3 obtained by causing the light from the second light source 10B to enter the diffracting grating at point P3. Then, based on a difference between differences of the pieces of phase information, which is obtained from a difference between detection signals of the first and second detecting units 20A and 20B, it is possible to detect an absolute position on the diffraction grating.

<Way in Which Light Travels>

Next, the following will give a detailed explanation of a way in which light from the head 4 according to the fourth embodiment travels.

<Optical Path from Light Source 10A to Detecting Unit 20A>

Beams of P- and S-polarized light are emitted from the light source 10A in a left lower direction in FIG. 8 (see the double-line arrow), and enter the polarization beam splitter (PBS) 40. The P-polarized light passes through the polarization beam splitter (PBS) 40 so as to travel straight (see the solid line arrow). Meanwhile, the S-polarized light is reflected by the polarization beam splitter (PBS) 40 so as to travel toward a right lower side in FIG. 8 (see the dotted-and-dashed line arrow).

[Point P1]

The P-polarized light having traveled straight is reflected by the mirror 30a so as to travel downward in FIG. 8, and then enters the detection surface 50a of the scale 50. Then, first-order diffracted light travels in a positive first-order direction, i.e., in a right upper direction in FIG. 8. Consequently, positive first-order diffracted light including phase information at point P1 is obtained. The positive first-order diffracted light traveling from the detection surface 50a of the scale 50 in the right upper direction in FIG. 8 enters the reflecting wavelength plate 32a, so as to be reflected to travel reversely, i.e., in a left lower direction in FIG. 8. The polarization direction of the P-polarized light having entered the reflecting wavelength plate 32a is changed by 90 degrees by the reflecting wavelength plate 32a, so that the P-polarized light is turned into S-polarized light and is reflected.

Positive first-order diffracted light of the S-polarized light having been reflected by the reflecting wavelength plate 32a to travel in the left lower direction in FIG. 8 enters the detection surface 50a of the scale 50. Then, positive first-order diffracted light of the positive first-order diffracted light travels in a positive first-order direction, i.e., upward in FIG. 8. Consequently, diffracted light including the phase information at point P1 is obtained. The diffracted light traveling from the scale 50 upward in FIG. 8 enters the mirror 30a. The diffracted light reflected by the mirror 30a to travel in a right upper direction in FIG. 8 enters the polarization beam splitter (PBS) 40. That is, the S-polarized light having been reflected by the reflecting wavelength plate 32a travels reversely along the optical path along which the P-polarized light having passed through the polarization beam splitter (PBS) 40 has traveled.

In addition, since the diffracted light having entered the polarization beam splitter (PBS) 40 is the S-polarized light, the diffracted light is reflected by the polarization beam splitter (PBS) 40 to travel in a left upper direction in FIG. 8, so as to travel toward the detecting unit 20A. Consequently, the diffracted light becomes a part of multiplexed light (interference light) entering the detecting unit 20A (see the double line).

[Point P4]

The S-polarized light having been reflected by the polarization beam splitter (PBS) 40 toward the right lower side in FIG. 8 is reflected by the mirror 30b so as to travel downward in FIG. 8, and then enters the detection surface 50a of the scale 50. Then, negative first-order diffracted light travels in a negative first-order direction, i.e., in a left upper direction in FIG. 8. Consequently, the negative first-order diffracted light including phase information at point P4 is obtained. The negative first-order diffracted light traveling from the detection surface 50a of the scale 50 in the left upper direction in FIG. 8 enters the reflecting wavelength plate 32b, so as to be reflected to travel reversely, i.e., in a right lower direction in FIG. 8. The polarization direction of the S-polarized light having entered the reflecting wavelength plate 32b is changed by 90 degrees by the reflecting wavelength plate 32b, so that the S-polarized light is turned into P-polarized light and is reflected.

Negative first-order diffracted light of the P-polarized light having been reflected by the reflecting wavelength plate 32b to travel in the right lower direction in FIG. 8 enters the detection surface 50a of the scale 50. Then, negative first-order diffracted light of the negative first-order diffracted light travels in a negative first-order direction, i.e., upward in FIG. 8. Consequently, diffracted light including the phase information at point P4 is obtained. The diffracted light traveling from the scale 50 upward in FIG. 8 enters the mirror 30b. The diffracted light reflected by the mirror 30b to travel in a left upper direction in FIG. 8 enters the polarization beam splitter (PBS) 40. That is, the P-polarized light having been reflected by the reflecting wavelength plate 32b travels reversely along an optical path along which the S-polarized light having passed through the polarization beam splitter (PBS) 40 has traveled.

Since the diffracted light having entered the polarization beam splitter (PBS) 40 is the P-polarized light, the diffracted light passes through the polarization beam splitter (PBS) 40, so as to travel toward the detecting unit 20A. Consequently, the diffracted light becomes a part of the multiplexed light (interference light) entering the detecting unit 20A (see the double line).

<Optical Path from Light Source 10B to Detecting Unit 20B>

An optical path from the second light source 10B to the detecting unit 20B is similar to those described above.

Beams of P- and S-polarized light are emitted from the light source 10B in a left lower direction in FIG. 8 (see the double-line arrow), and enter the polarization beam splitter (PBS) 40. The P-polarized light passes through the polarization beam splitter (PBS) 40 so as to travel straight (see the solid line arrow). Meanwhile, the S-polarized light is reflected by the polarization beam splitter (PBS) 40 so as to travel toward a right lower side in FIG. 8 (see the dotted-and-dashed line arrow).

[Point P2]

The P-polarized light having traveled straight is reflected by the mirror 30c so as to travel downward in FIG. 8, and then enters the detection surface 50a of the scale 50. Then, positive first-order diffracted light travels in a positive first-order direction, i.e., in a right upper direction in FIG. 8. Consequently, the positive first-order diffracted light including the phase information at point P2 is obtained. The positive first-order diffracted light traveling from the detection surface 50a of the scale 50 in a right upper direction in FIG. 8 enters the reflecting wavelength plate 32c, so as to be reflected to travel reversely in a left lower direction in FIG. 8. The polarization direction of the P-polarized light having entered the reflecting wavelength plate 32c is changed by 90 degrees by the reflecting wavelength plate 32c, so that the P-polarized light is turned into S-polarized light and is reflected.

Positive first-order diffracted light of the S-polarized light having been reflected by the reflecting wavelength plate 32c to travel in the left lower direction in FIG. 8 enters the detection surface 50a of the scale 50. Then, positive first-order diffracted light of the positive first-order diffracted light travels in a positive first-order direction, i.e., upward in FIG. 8. Consequently, diffracted light including the phase information at point P1 is obtained. The diffracted light traveling from the scale 50 upward in FIG. 8 enters the mirror 30a. The diffracted light reflected by the mirror 30a to travel in a right upper direction in FIG. 8 enters the polarization beam splitter (PBS) 40. That is, the S-polarized light having been reflected by the reflecting wavelength plate 32a travels reversely along an optical path along which the P-polarized light having passed through the polarization beam splitter (PBS) 40 has traveled.

In addition, since the diffracted light having entered the polarization beam splitter (PBS) 40 is the S-polarized light, the diffracted light is reflected by the polarization beam splitter (PBS) 40 to travel in a left upper direction in FIG. 8, so as to travel toward the detecting unit 20B. Consequently, the diffracted light becomes a part of multiplexed light (interference light) entering the detecting unit 20B (see the double line).

[Point P3]

The S-polarized light having been reflected by the polarization beam splitter (PBS) 40 toward a right lower side in FIG. 8 is reflected by the mirror 30d so as to travel downward in FIG. 8, and then enters the detection surface 50a of the scale 50. Then, the negative first-order diffracted light travels in a negative first-order direction, i.e., in a left upper direction in FIG. 8. Consequently, negative first-order diffracted light including phase information at point P3 is obtained. The negative first-order diffracted light traveling from the detection surface 50a of the scale 50 in a left upper direction in FIG. 8 enters the reflecting wavelength plate 32d, so as to be reflected to travel reversely in a right lower direction in FIG. 8. The polarization direction of the S-polarized light having entered the reflecting wavelength plate 32d is changed by 90 degrees by the reflecting wavelength plate 32d, so that the S-polarized light is turned into P-polarized light and is reflected.

Negative first-order diffracted light of the P-polarized light having been reflected by the reflecting wavelength plate 32d to travel in a right lower direction in FIG. 8 enters the detection surface 50a of the scale 50. Then, negative first-order diffracted light of the negative first-order diffracted light travels in a negative first-order direction, i.e., upward in FIG. 8. Consequently, diffracted light including the phase information at point P3 is obtained. The diffracted light traveling from the scale 50 upward in FIG. 8 enters the mirror 30d. The diffracted light reflected by the mirror 30d to travel in a left upper direction in FIG. 8 enters the polarization beam splitter (PBS) 40. That is, the P-polarized light having been reflected by the reflecting wavelength plate 32d travels reversely along an optical path along which the S-polarized light having passed through the polarization beam splitter (PBS) 40 has traveled.

Since the diffracted light having entered the polarization beam splitter (PBS) 40 is the P-polarized light, the diffracted light passes through the polarization beam splitter (PBS) 40, so as to travel toward the detecting unit 20B. Consequently, the diffracted light becomes a part of the multiplexed light (interference light) entering the detecting unit 20B (see the double line).

With the configuration described above, in the fourth embodiment, upon reception of the multiplexed light (interference light) including the phase information at point P1 and the phase information at point P4, the first detecting unit 20A generates a detection signal "P1+P4". Similarly, upon reception of the multiplexed light (interference light) including the phase information at point P2 and the phase information at point P3, the second detecting unit 20B generates a detection signal "P2+P3". By calculating a difference between these detection signals, it is possible to obtain information "(P1+P4)−(P2+P3)".

This can be rewritten into "(P4−P3)−(P2−P1)". Thus, similarly to the first to third embodiments described above, it is possible to obtain the difference "(P4−P3)−(P2−P1)" between the differences of the pieces of phase information, which is a difference between the difference (P4−P3) in the second region and the difference (P2−P1) in the first region. By use of this, it is possible to detect an absolute position in the X-axis direction with respect to the scale 50.

In the present embodiment, the positive first-order diffracted light and the negative first-order diffracted light are employed. However, this is one example. Alternatively, second or higher-order diffracted light may be employed. The order of diffracted light used in the optical path between the first light source 10A and the first detecting unit 20A and the order of diffracted light used in the optical path between the second light source 10B and the second detecting unit 20B may be different from each other.

That is, the first detecting unit 20A receives positive or negative M-th order diffracted light (M is an integer equal to or greater than 1) obtained by causing polarized light of light from the first light source 10A to enter the diffraction grating at one point (P1) as well as negative or positive M-th order diffracted light obtained by causing polarized light of the light from the first light source 10A to enter the diffraction grating at the other point (P4), whereas the second detecting unit 20B receives positive or negative N-th order diffracted light (N is an integer equal to or greater than 1) obtained by causing polarized light of light from the second light source 10B to enter the diffraction grating at one point (P2) as well as negative or positive N-th order diffracted light obtained by causing polarized light of the light from the second light source 10B to enter the diffraction grating at the other point (P3).

(Summary of Embodiments)

The various embodiments described above can be summarized as below.

The detection device 2 includes the single head 4 including the light source 10 (10A, 10B: in the fourth embodiment) and the detecting unit 20 (20A, 20B: in the fourth embodiment) for receiving multiplexed light (interference light) of diffracted light obtained by causing light from the light source to enter first two points residing on the diffraction grating and being separated from each other by a known distance and diffracted light obtained by causing the light from the light source to enter second two points residing on the diffraction grating, being separated from each other by the known distance, and including at least one point being different from the first two points.

Here, the first two points residing on the diffraction grating and being separated from each other by the known distance correspond to point P1 and point P2, which are separated from each other by the distance L1. Meanwhile, the second two points residing on the diffraction grating, being separated from each other by the known distance, and including at least one point being different from the first two points correspond to point P3 (or P2: in the third embodiment) and point P4, which are separated from each other by the distance L1.

The diffraction grating includes two regions (the first region R1 between P1 and P2 and the second region between P3 (P2) and P4) each being separated from each other by the known distance L1 and each having at least partially grating interval lengths. With this, it is possible to detect an absolute position on the diffraction grating based on the multiplexed light (interference light) received by the detecting unit 20.

With this configuration, it is possible to provide a small detection device 2 capable of detecting an accurate absolute position with a single head. This enables a space-saving arrangement that is free from problems such as occurrence of electrical noise and limitation on an installation position.

Particularly, since the certain detecting unit 20 (20A, 20B) receives multiplexed light of beams of light including pieces of phase information obtained at the diffraction points P1, P2, P3, and P4 (P1 and P4, P2 and P3), it is possible to detect the absolute position with the single head 4.

The detection device 2 according to each of the first to third embodiments of the present invention is configured as below.

That is, the head 4 includes the light source 10 whose number is one and the detecting unit 20 whose number is one, and an absolute position on the diffraction grating can be detected based on multiplexed light (interference light) of first diffracted light and second diffracted light, the first diffracted light being negative or positive M-th order first diffracted light obtained by causing polarized light of light from the light source 10 to enter the first region, which is between the first two points (P1, P2) separated from each other by the known distance L1, of the diffraction grating at one (P1) of the first two points and by causing the resulting positive or negative M-th order diffracted light (M is an integer equal to or greater than 1) to enter the diffraction grating at the other (P2) of the first two points, the second diffracted light being negative or positive M-th order second diffracted light obtained by causing polarized light of the light from the light source 10 to enter the second region, which is between the second two points (P3(P2), P4) separated from each other by the known distance L1, of the diffraction grating at one (P3 (P2)) of the second two points and by causing the resulting positive or negative M-th order diffracted light to enter the diffraction grating at the other (P4) of the second two points.

With such a configuration, it is possible to detect an absolute position on the diffraction grating with the compact head 4 including the single light source 10 and the single detecting unit 20.

The detection device 2 according to the fourth embodiment is configured as below.

That is, the head 4 includes the first light source 10A and the first detecting unit 20A associated with the first light source 10A as well as the second light source 10B and the second detecting unit 20B associated with the second light source 10B, and an absolute position on the diffraction grating can be detected based on a difference between detection signals of the first detecting unit 20A and the second detecting unit 20B, the detection signal of the first detecting unit 20A being a detection signal that the first detecting unit 20A generates upon reception of multiplexed light (interference light) of positive or negative M-th order diffracted light (M is an integer equal to or greater than 1) obtained by causing polarized light of light from the first light source 10A to enter the first region, which is between first two points (P1, P4) separated from each other by a known distance (2L1+1), of the diffraction grating at one (P1) of the first two points and negative or positive M-th order diffracted light obtained by causing polarized light of the light from the first light source 10A to enter the diffraction grating at the other (P4) of the first two points, the detection signal of the second detecting unit 20B being a detection signal that the second detecting unit 20B generates upon reception of multiplexed light (interference light) of positive or negative N-th order diffracted light (N is an integer equal to or greater than 1) obtained by causing polarized light of light from the second light source 10B to enter the second region, which is between second two points (P2, P3) separated from each other by a known distance (L2), of the diffraction grating at one (P2) of the second two points and negative or positive N-th order diffracted light obtained by causing polarized light of the light from the second light source 10B to enter the diffraction grating at the other (P3) of the second two points.

With the configuration including the light sources 10A, 10B and the detecting units 20A, 20B individually provided, it is possible to provide a highly reliable detection device 2 without need for an optical member such as a mirror for causing diffracted light from the diffraction grating to reenter the diffraction grating.

The above-described alternative example can be applied not only to the first embodiment shown FIG. 5 but also to the second embodiment shown FIG. 6. In that case, in both beams of P- and S-polarized light, positive first-order light enters the detection surface 50a of the scale 50 in a vertical direction thereto, and negative first-order light travels from the detection surface 50a of the scale 50 in a vertical direction thereto. Therefore, even if the detection surface 50a of the scale 50 moves in an upper or lower direction in the drawing, negative first-order light always enters the detecting unit 20. Accordingly, even if a clearance of the detection surface 50a of the scale 50 changes, it can be absorbed and a precise detection can surly be performed.

The foregoing has explained the embodiments and aspects of the present invention. However, details of the contents of the present disclosure may be modified. The elements of the embodiments and aspects may be combined in various ways and the orders thereof may be modified without departing from the scope and ideas of the present invention.

REFERENCE SIGNS LIST 2 detection device
4 head
6 moving mechanism
10 light source
10A first light source
10B second light source
20 detecting unit
20A first detecting unit
20B second detecting unit
30a to 30d mirror
30b1, b2, c1, c2 mirror
32a to 32d reflecting wavelength plate
40, 40a, 40b polarization beam splitter (PBS)
50 scale
50a detection surface
R1 first region
R2 second region

What is claimed is:

1. A detection device comprising a head including a light source and a detecting unit configured to receive multiplexed light (interference light) of diffracted light obtained by causing light from the light source to enter first two points residing on a diffraction grating and being separated from each other by a known distance and diffracted light obtained by causing the light from the light source to enter second two points residing on the diffraction grating, being separated from each other by a known distance, and including at least one point being different from the first two points,
wherein the diffraction grating includes a first region between the first two points separated from each other by the known distance and a second region between the second two points separated from each other by the known distance, the first and second regions having at least partially different grating interval lengths, and an absolute position on the diffraction grating is detected based on the multiplexed light (interference light) received by the detecting unit.

2. The detection device according to claim 1, wherein the detecting unit, which is a certain single element, receives the multiplexed light of beams of light including pieces of phase information obtained at respective diffraction points.

3. The detection device according to claim 1, wherein
- the head includes the light source whose number is one and the detecting unit whose number is one, and
- an absolute position on the diffraction grating is detected based on multiplexed light (interference light) of first diffracted light and second diffracted light, the first diffracted light being negative or positive M-th order first diffracted light obtained by causing polarized light of light from the light source to enter a first region, which is between first two points separated from each other by a known distance, of the diffraction grating at one of the first two points and by causing resulting positive or negative M-th order diffracted light to enter the diffraction grating at another one of the first two points, the second diffracted light being negative or positive M-th order second diffracted light obtained by causing polarized light of the light from the light source to enter a second region, which is between second two points separated from each other by a known distance, of the diffraction grating at one of the second two points and by causing resulting positive or negative M-th order diffracted light to enter the diffraction grating at another one of the second two points, where M is an integer equal to or greater than 1.

4. The detection device according to claim 1, wherein
- the head includes the light source including a first light source and a second light source, and the detecting unit including a first detecting unit which is associated with the first light source and a second detecting unit which is associated with the second light source, and
- an absolute position on the diffraction grating is detected based on a difference between detection signals of the first detecting unit and the second detecting unit, the detection signal of the first detecting unit being a detection signal that the first detecting unit generates upon reception of multiplexed light (interference light) of positive or negative M-th order diffracted light obtained by causing polarized light of light from the first light source to enter a first region, which is between first two points separated from each other by a known distance, of the diffraction grating at one of the first two points and negative or positive M-th order diffracted light obtained by causing polarized light of the light from the first light source to enter the diffraction grating at another one of the first two points, the detection signal of the second detecting unit being a detection signal that the second detecting unit generates upon reception of multiplexed light (interference light) of positive or negative N-th order diffracted light obtained by causing polarized light of light from the second light source to enter a second region, which is between second two points separated from each other by a known distance, of the diffraction grating at one of the second two points and negative or positive N-th order diffracted light obtained by causing polarized light of the light from the second detecting unit to enter the diffraction grating at another one of the second two points, where each of M and N is an integer equal to or greater than 1.

5. The detection device according to claim 1, wherein the diffraction grating has a grating pattern with which a single absolute position is determined based on a difference in grating interval length, even in a case where the two first and second regions are at any locations on the diffraction grating.

6. The detection device according to claim 5, wherein the grating pattern of the diffraction grating has a density that increases with increasing proximity from one end toward a center and decreases with increasing proximity from the center toward another end.

7. The detection device according to claim 1, wherein pieces of phase information on the grating are determined based on the grating interval lengths, the pieces of phase information are obtained from beams of diffracted light at two points residing on each of the two first and second regions and being separated from each other by the known distance, and an absolute position on the diffraction grating is detected based on a difference between differences yielded from the pieces of phase information obtained from the beams of diffracted light.

8. The detection device according to claim 7, wherein each of the pieces of phase information on the grating is approximated by a cubic expression, and the difference between the differences yielded from the pieces of phase information obtained from the beams of diffracted light is approximated by a linear expression.

* * * * *